United States Patent

Moon

Patent Number: 6,167,546
Date of Patent: Dec. 26, 2000

[54] METHOD AND APPARATUS FOR AUTOMATICALLY INPUTTING DEBUGGING DATA OF A VIDEO CASSETTE RECORDER

[75] Inventor: Ki-Bok Moon, Seoul, Rep. of Korea

[73] Assignee: Daewoo Electronics Co., Ltd., Seoul, Rep. of Korea

[21] Appl. No.: 09/067,963

[22] Filed: Apr. 29, 1998

[30] Foreign Application Priority Data

Apr. 30, 1997 [KR]  Rep. of Korea ............... 97-016567

[51] Int. Cl.[7] .................................................. G01R 31/28
[52] U.S. Cl. ............................................. 714/724; 386/46
[58] Field of Search ........................... 714/746, 25, 40, 714/724; 386/1, 45, 46, 125, 126

[56] References Cited

U.S. PATENT DOCUMENTS

| | | | |
|---|---|---|---|
| 4,682,246 | 7/1987 | Efron et al. | 386/46 |
| 4,847,840 | 7/1989 | Jinguji | 714/699 |
| 4,907,181 | 3/1990 | Hedtke et al. | 702/185 |
| 5,444,438 | 8/1995 | Goldberg | 340/825.44 |
| 5,588,009 | 12/1996 | Will | 714/749 |
| 6,046,780 | 4/2000 | Tani | 348/722 |

FOREIGN PATENT DOCUMENTS 2267009A  11/1993  United Kingdom ........... H04N 17/06

OTHER PUBLICATIONS

Ooi, et al., Computer–Aided Testing Station for VCRs, IEEE, 1990.

Ooi, et al., Computer–Aided Manufacturing Information System for VCR Testing, IEEE, 1991.

Ooi, et al., A Novel Emulator for VCR Servo Controller Testing, IEEE, 1991.

*Primary Examiner*—Albert De Cady
*Assistant Examiner*—Guy Lamarre
*Attorney, Agent, or Firm*—Pillsbury Madison & Sutro LLP

[57] ABSTRACT

A method and an apparatus for automatically inputting debugging data of a video cassette recorder are disclosed. Data generating section reads a debugging data in response to a debugging execution signal from a user and serially generates the read debugging data. Data transmission port outputs the debugging data serially inputted from the data generating section. Data transmission section converts a voltage level and a data form of the debugging data from the data transmission port and transmits the converted debugging data to a video cassette recorder. As a result, an operator can obtain an accurate result of the debugging operation and can easily finish the operation which inputs the debugging data to the video cassette recorder in a small amount of time as well.

7 Claims, 2 Drawing Sheets

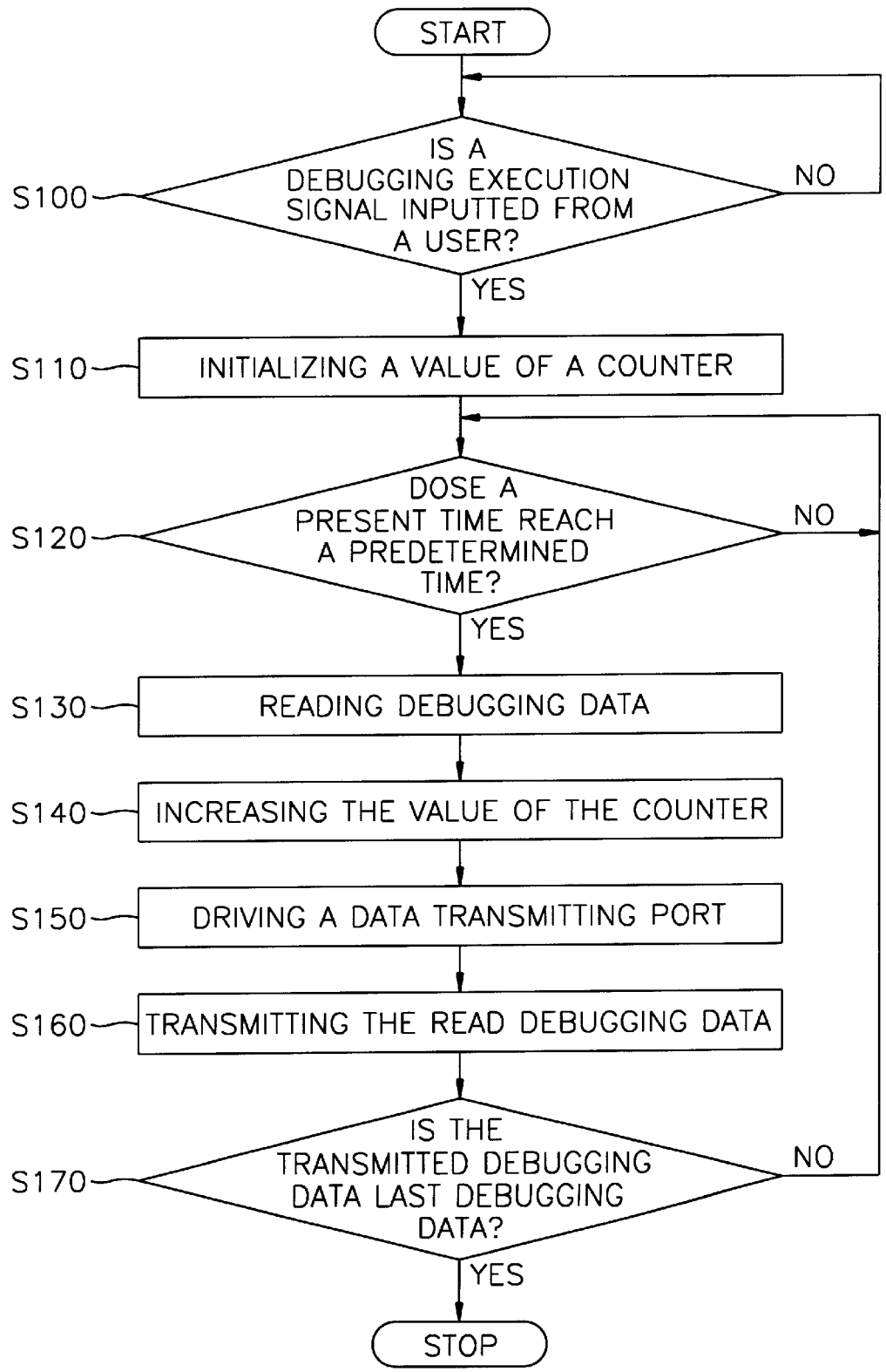

METHOD AND APPARATUS FOR AUTOMATICALLY INPUTTING DEBUGGING DATA OF A VIDEO CASSETTE RECORDER

BACKGROUND OF THE INVENTION

1. Field of the Invention

The present invention relates to a method and an apparatus for automatically inputting a debugging operation of testing a video cassette recorder.

2. Description of the Prior Art

In general, a debugging test data for both an operation error related to the execution of a specific function and a structural problem thereof is executed for a video cassette recorder whose manufacturing process has been completed. This kind of debugging operation is executed by a manual operation of an operator.

Namely, the operator connects to the video cassette recorder a monitor for executing the debugging operation, and then connects to the video cassette recorder measuring instruments for measuring various data including debugging data. After manually inputting the debugging data related to the testing function to the video cassette recorder, the operator identifies a state of the video cassette recorder through the monitor or the measuring instruments.

U.S. Pat. No. 4,907,181 (granted to Rolf Hedtke et al.) titled "TEST AND MONITORING SYSTEM FOR A DIGITAL VIDEO TAPE RECORDER/REPRODUCER" discloses a testing and monitoring system of a digital video cassette recorder. According to the above-mentioned system, an actual signal is compared with a reference signal at a test node during a normal operation or a test operation, syndrome units which are related to an error prevention and an error correction are used for test or monitor circuits, the testing and monitoring are performed in a system wherein a microcomputer is connected to test nodes of an equipment to be tested or monitored over a test bus.

As described above, a conventional debugging operation for the video cassette recorder is manually executed by the operator. Accordingly, the operator cannot obtain an accurate result of the debugging operation and has to spend much time on performing the debugging operation. Also, a manual operation inconveniences the operator.

SUMMARY OF THE INVENTION

Therefore, it is a first object of the present invention to provide a method for automatically inputting debugging data for testing a function of a video cassette recorder.

It is a second object of the present invention to provide an apparatus for automatically inputting debugging data for testing a function of a video cassette recorder.

In order to achieve the above first object, the present invention provides a method for automatically inputting debugging data of a video cassette recorder, which comprises:

(i) initializing a value of a counter based on whether or not a debugging execution signal is inputted;
(ii) reading debugging data based on whether or not a present time reaches a predetermined time;
(iii) transmitting the debugging data read in step (ii);
(iv) checking whether or not the debugging data transmitted in step (iii) is last debugging data;
(v) stopping the transmission of the debugging data when it is checked in step (iv) that the debugging data transmitted in step (iii) is the last debugging data; and
(vi) returning step (ii) when it is checked in step (iv) that the debugging data transmitted in step (iii) is not the last debugging data.

In order to achieve the above second object, the present invention provides an apparatus for automatically inputting debugging data of a video cassette recorder, which comprises:

data generating means for reading debugging data in response to a debugging execution signal from a user and for serially generating read debugging data;

a data transmission port for outputting the debugging data serially inputted from said data generating means; and data transmission means for converting a voltage level and a data form of the debugging data from said data transmission port and for transmitting converted debugging data to a video cassette recorder.

In the method and apparatus for automatically inputting debugging data of a video cassette recorder according to the present invention, debugging data used to executed a debugging operation of the video cassette recorder is automatically generated by means of a computer system having a debugging data processing program. Also, the debugging data is automatically transmitted by the computer system, the data transmission port and jig.

As a result, an operator can easily finish the operation which inputs the debugging data to the video cassette recorder in a small amount of time and can obtain accurate debugging operation results.

BRIEF DESCRIPTION OF THE DRAWINGS

The above objects and other advantage of the present invention will become more apparent by describing in detail a preferred embodiment thereof with reference to the attached drawings, in which:

FIG. 2 is a flowchart for illustrating a method for automatically inputting debugging data of a video cassette recorder by using the apparatus shown in FIG. 1.

DESCRIPTION OF THE PREFERRED EMBODIMENT

Figure 1:
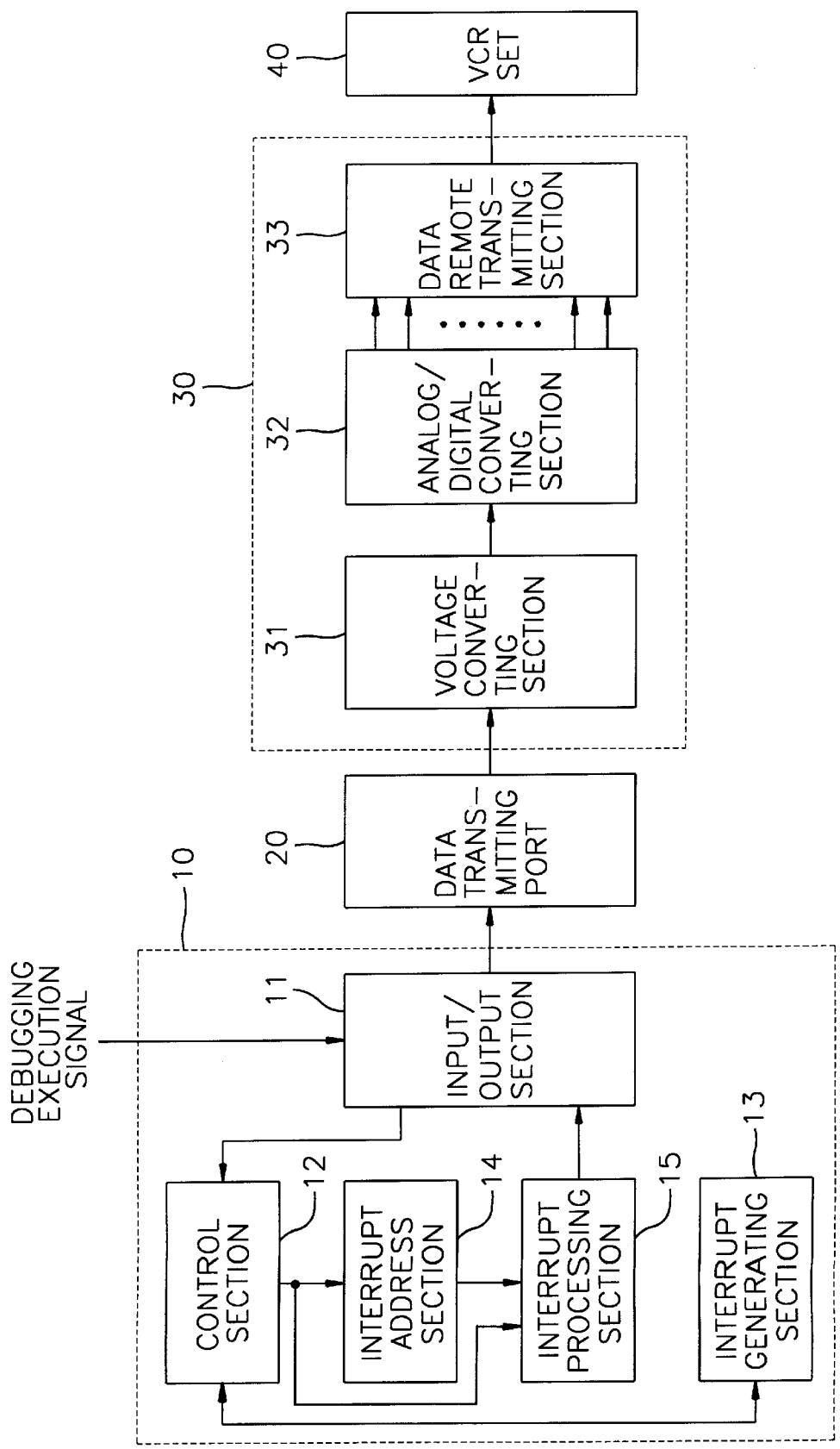
FIG. 1 is a block diagram for showing a circuit configuration of an apparatus for automatically inputting debugging data of a video cassette recorder according to the present invention.

A description will be given below in detail with reference to the accompanying drawings to a configuration and an operation of a method and an apparatus for automatically inputting debugging data of a video cassette recorder according to an embodiment of the present invention.

FIG. 1 is a block diagram for showing the circuit configuration of an apparatus for automatically inputting debugging data of a video cassette recorder according to an embodiment of the present invention. As shown in FIG. 1, the apparatus for automatically inputting debugging data of a video cassette recorder comprises a computer system 10(hereinafter, referred to as "data generating section"), a data transmission port 20, a jig 30, and a video cassette recorder 40. Data generating section 10 comprises an input/output section 11, a control section 12, an interrupt generating section 13, an interrupt address section 14, and an interrupt processing section 15. Jig 30 comprises a voltage converting section 31, an analog/digital converting section 32, and a data remote transmission section 33.

Input/output section 11 outputs a debugging execution signal which is generated by a user to control section 12 and outputs debugging data from interrupt processing section 15 to data transmission port 20.

Control section 12 controls interrupt generating section 13 to drive a debugging program in order to execute the debugging operation in response to the debugging execution signal from input/output section 11.

Control section 12 provides an interrupt processing signal to interrupt address section 14 and interrupt processing section 15 in response to an interrupt signal from interrupt generating section 13.

Interrupt generating section 13 executes the debugging program in response to the control of control section 12 and generates an interrupt signal in order to generate the debugging data of the video cassette recorder 40.

Interrupt address section 14 generates an address signal corresponding to the interrupt signal which is generated from interrupt generating section 13 and predetermined data corresponding to the address signal in response to the interrupt processing signal from control section 12.

Interrupt processing section 15 generates debugging data corresponding to the interrupt signal which is generated from interrupt generating section 13 in response to the address signal, the predetermined data from interrupt address section 14, and the interrupt processing signal from control section 12.

Data transmission port 20 provides the debugging data from input/output section 11 to voltage converting section 31 serially.

Voltage converting section 31 converts a voltage level of the debugging data from data transmission port 20. At this time, the voltage level of the debugging data provided from data transmission port is generally 12 volts, the voltage level of the debugging data which is converted the voltage level by means of voltage converting section 31 is 5 volts.

Analog/digital converting section 32 converts the debugging data from voltage converting section 31 into debugging data of digital form and provides the converted debugging data to data remote transmission section 33.

Data remote transmission section 33 provides the debugging data from analog/digital converting section 32 to the video cassette recorder 40.

A description will be made next of the procedure of the method for automatically inputting debugging data of a video cassette recorder which is performed by the apparatus shown in FIG. 1, in accordance with the flowchart of FIG. 2.

FIG. 2 is a flowchart for illustrating a method for automatically inputting debugging data of a video cassette recorder by using the apparatus which is shown in FIG. 1.

As shown in FIG. 2, control section 12 judges whether or not a debugging execution signal is inputted from a user (step S100).

When it is judged in step S100 that the debugging execution signal is not inputted, control section 12 returns to step S100.

When it is judged in step S100 that the debugging execution signal is inputted, control section 12 controls interrupt address section 14 and interrupt processing section 15 in response to the interrupt signal which is generated from interrupt generating section 13 and initializes a value of a counter (not shown) (step S110).

Hereinafter, control section 12 judges whether or not a present time reaches a predetermined time (step S120). Namely, control section 12 judges whether or not the predetermined time is passed after initializing the value of the counter in step S110.

When it is judged in step S120 that the present time does not reach the predetermined time, control section 12 repeatedly executes step S120.

When it is judged in step S120 that the present time reaches the predetermined time, control section 12 reads the debugging data generated by means of interrupt address section 14 and interrupt processing section 15 (step S130).

In step S140, control section 12 increases the value of the counter by a predetermined value and drives data transmission port 20 in order to transmit the debugging data which is read in step S130 (step S150).

Control section 12 transmits the debugging data read in step S130 through data transmission port 20 driven in step S150 to jig 30 (step S160).

Control section 12 judges whether or not the debugging data which is transmitted in step S160 is last debugging data (step S170).

When it is judged in step S170 that the debugging data which is transmitted in step S160 is last debugging data, control section 12 stops transmission operation of the debugging data.

When it is judged in step S170 that the debugging data which is transmitted in step S160 is not last debugging data, control section 12 returns to step S120 which judges the present time.

In the method and apparatus for automatically inputting debugging data of a video cassette recorder according to the present invention, debugging data used to executed the debugging operation of the video cassette recorder is automatically generated by means of the computer system having a debugging data processing program stored therein. Also, the debugging data is automatically transmitted by the computer system via the data transmission port and jig.

As a result, an operator can obtain an accurate result of the debugging operation and can easily finish the operation which inputs the debugging data to the video cassette recorder in a small amount of time as well.

While the present invention had been particularly shown and described with reference to a particular embodiment thereof, it will be understood by those skilled in the art that various changes in form and details may be effected therein without departing from the spirit and scope of the invention as defined by the appended claims.

What is claimed is:

1. A method for automatically inputting debugging data of a video cassette recorder, said method comprising the steps of:
   (i) initializing a value of a counter based on whether or not a debugging execution signal is inputted;
   (ii) reading debugging data based on whether or not a present time reaches a predetermined time;
   (iii) transmitting the debugging data read in step (ii);
   (iv) checking whether or not the debugging data transmitted in step (iii) is last debugging data;
   (v) stopping the transmission of the debugging data when it is checked in step (iv) that the debugging data transmitted in step (iii) is the last debugging data; and
   (vi) returning to step (ii) when it is checked in step (iv) that the debugging data transmitted in step (iii) is not the last debugging data.

2. The method for automatically inputting debugging data of a video cassette recorder as claimed in claim 1, wherein said step (i) comprises the substeps of:

(i-1) checking whether or not the debugging execution signal is inputted;

(i-2) returning to step (i-1) when it is checked in step (i-1) that the debugging execution signal is not inputted; and (i-3) initializing the value of the counter when it is checked in step (i-1) that the debugging execution signal is inputted.

3. The method for automatically inputting debugging data of a video cassette recorder as claimed in claim 1, wherein said step (ii) comprises the substeps of:

(ii-1) checking whether or not the present time reaches the predetermined time;

(ii-2) returning to step (ii-1) when it is checked in step (ii-1) that the present time does not reach the predetermined time; and (ii-3) reading the debugging data when it is checked in step (ii-1) that the present time reaches the predetermined time.

4. The method for automatically inputting debugging data of a video cassette recorder as claimed in claim 1, wherein said step (iii) comprises the substeps of:

(iii-1) increasing the value of the counter by a predetermined value;

(iii-2) driving a data transmission port; and (iii-3) transmitting the debugging data read in step (ii) through the data transmission port driven in step (iii-2).

5. An apparatus for automatically inputting debugging data of a video cassette recorder, said apparatus comprising:

interrupt generating means for executing a predetermined program in response to a debugging execution signal from a user and for generating an interrupt signal in order to execute a debugging operation;

control means for generating an interrupt processing signal in response to the interrupt signal from said interrupt generating means;

interrupt address means, responsive to the interrupt processing signal from said control means, for generating an address signal corresponding to the interrupt signal generated from said interrupt generating means and predetermined data corresponding to the address signal;

interrupt processing means for generating debugging data corresponding to the interrupt signal generated from said interrupt generating means in response to the address signal, the predetermined data from said interrupt address means, and the interrupt processing signal from said control means;

input/output means for outputting the debugging execution signal from the user to said control means and for outputting the debugging data from said interrupt processing means;

a data transmission port for outputting the debugging data serially inputted from said input/output means; and data transmission means for converting a voltage level and a data form of the debugging data from said data transmission port and for transmitting converted debugging data to the video cassette recorder.

6. The apparatus for automatically inputting debugging data of a video cassette recorder as claimed in claim 5, wherein said data transmission means comprises:

voltage converting means for converting the voltage level of the debugging data from said data transmission port;

analog/digital converting means for converting the debugging data from said voltage converting means into a digital signal; and data remote transmission means for transmitting the debugging data to said video cassette recorder from said analog/digital converting means.

7. The apparatus for automatically inputting debugging data of a video cassette recorder as claimed in claim 6, wherein said voltage converting means converts the voltage level of the debugging data from said data transmission port into 5 volts.

* * * * *